US012778720B2

United States Patent
(12) United States Patent
Hall et al.

(10) Patent No.: US 12,778,720 B2
(45) Date of Patent: Nov. 3, 2026

(54) COMPOSITE ORTHODONTIC SPACER

(71) Applicant: SPECIFIC DIVE JUKE LLC, Indianapolis, IN (US)

(72) Inventors: Tasha E. Hall, Indianapolis, IN (US); Michael C. Frazier, Zionsville, IN (US)

(73) Assignee: SPECIFIC DIVE JUKE LLC, Indianapolis, IN (US)

( * ) Notice: Subject to any disclaimer, the term of this patent is extended or adjusted under 35 U.S.C. 154(b) by 531 days.

(21) Appl. No.: 18/026,383

(22) PCT Filed: Sep. 10, 2021

(86) PCT No.: PCT/US2021/049759
§ 371 (c)(1),
(2) Date: Mar. 15, 2023

(87) PCT Pub. No.: WO2022/060632
PCT Pub. Date: Mar. 24, 2022

(65) Prior Publication Data

US 2024/0216110 A1 Jul. 4, 2024

Related U.S. Application Data

(60) Provisional application No. 63/078,405, filed on Sep. 15, 2020.

(51) Int. Cl.
*A61C 7/36* (2006.01)

(52) U.S. Cl.
CPC .................................... *A61C 7/36* (2013.01)

(58) Field of Classification Search
CPC .... A61C 7/36; A61C 5/80; A61C 5/82; A61C 5/85; A61C 5/88; A61C 5/60; A61C 5/007; A61C 3/005
See application file for complete search history.

(56) References Cited

U.S. PATENT DOCUMENTS 4,509,918 A * 4/1985 Clark ...................... A61C 7/36 433/5
4,544,359 A 10/1985 Waknine
(Continued)

FOREIGN PATENT DOCUMENTS

CA 2728920 A1 12/2009

OTHER PUBLICATIONS

U.S. Patent and Trademark Office; International Search Report and Written Opinion; International Application No. PCT/US2021/049759; 9 pages; dated Dec. 10, 2021.
(Continued)

*Primary Examiner* — Ralph A Lewis
(74) *Attorney, Agent, or Firm* — Faegre Drinker Biddle & Reath LLP

(57) ABSTRACT

The present disclosure provides an orthodontic spacer including a composite body formed from a curable and dimensionally stable resin formulation. The composite body has a first contact surface, a second contact surface, and a predetermined thickness between the first contact surface and the second contact surface. The spacer limits movement of the patient's mouth and inhibits the patient's teeth from biting or otherwise contacting an orthodontic appliance.

21 Claims, 5 Drawing Sheets

(56) References Cited

U.S. PATENT DOCUMENTS

| | | | | | |
|---|---|---|---|---|---|
| 4,619,609 | A * | 10/1986 | Clark | A61C 7/00 | 433/6 |
| 4,763,791 | A | 8/1988 | Halverson et al. | | |
| 5,059,120 | A | 10/1991 | Lee | | |
| 5,443,384 | A * | 8/1995 | Franseen | A61C 7/00 | 433/18 |
| 5,487,662 | A | 1/1996 | Kipke et al. | | |
| 5,636,985 | A | 6/1997 | Simmen et al. | | |
| 6,368,106 | B1 * | 4/2002 | Clark | A61C 7/36 | 433/19 |
| 6,726,473 | B1 | 4/2004 | Guray | | |
| 6,854,974 | B1 * | 2/2005 | Suhonen | A61C 5/88 | 433/80 |
| 6,932,598 | B1 | 8/2005 | Anderson | | |
| 7,854,610 | B2 * | 12/2010 | Dellinger | A61C 7/006 | 433/18 |
| 8,192,673 | B2 | 6/2012 | Bowman et al. | | |
| 8,257,079 | B1 * | 9/2012 | Plowman | A61C 7/36 | 433/18 |
| 11,633,261 | B2 * | 4/2023 | Wu | A61C 7/08 | 433/24 |
| 2008/0102414 | A1 * | 5/2008 | Abels | A61C 7/00 | 433/24 |
| 2010/0106275 | A1 | 4/2010 | Andersson et al. | | |
| 2010/0304130 | A1 | 12/2010 | Preti et al. | | |
| 2010/0304325 | A1 | 12/2010 | Fletcher | | |
| 2017/0304108 | A1 | 10/2017 | Simonetti | | |
| 2024/0216110 | A1 * | 7/2024 | Hall | A61C 7/36 | |

OTHER PUBLICATIONS

Magnum Ortho; Mini Molds; from https://magnumortho.com/product-category/mini-molds/; 9 pages; Jul. 8, 2020.

Reliance Orthodontic Products, Inc.; Excel Fast Part A Safety Data Sheet; Federal Register; vol. 77, No. 58; 7 pages; Feb. 6, 2018.

* cited by examiner

COMPOSITE ORTHODONTIC SPACER

CROSS-REFERENCE TO RELATED APPLICATION

This application claims priority to U.S. Patent Application No. 63/078,405, filed Sep. 15, 2020, incorporated by reference herein for all purposes.

FIELD OF THE DISCLOSURE

The present disclosure relates to orthodontic spacers. More particularly, the present disclosure relates to composite orthodontic spacers, and to a method for using the same.

BACKGROUND OF THE DISCLOSURE

Orthodontic treatment requires installation of one or more orthodontic appliances in a patient's mouth. In certain situations, an orthodontist or another orthodontic professional may apply a spacer (i.e., a build-up, a bite block) to limit movement of the patient's mouth and restrict the patient's full bite closure, thereby inhibiting the patient's teeth from contacting upper and/or lower orthodontic appliances. For example, to inhibit the patient's upper molars from biting down and contacting the lower orthodontic appliance (e.g., a lower bracket), the orthodontic professional may form spacers on the patient's lower molars. This process may involve injecting a flowable resin onto the patient's lower molars and curing the resin to form the spacers. However, this process is difficult to control precisely, such that the molar spacers may be too small or too large. This process is also time consuming and uncomfortable for the patient. Alternatively, this process may involve adhering pre-formed (e.g., metallic) spacers onto the patient's teeth. However, such spacers may be susceptible to detachment and uncomfortable for the patient.

SUMMARY

The present disclosure provides an orthodontic spacer including a composite body formed from a curable and dimensionally stable resin formulation. The composite body has a first contact surface, a second contact surface, and a predetermined thickness between the first contact surface and the second contact surface. The spacer limits movement of the patient's mouth and inhibits the patient's teeth from biting or otherwise contacting an orthodontic appliance.

According to an embodiment of the present disclosure, a composite orthodontic spacer is provided including a composite body formed from a curable and dimensionally stable resin formulation, wherein the composite body has a first contact surface configured to contact a first tooth, a second contact surface configured to contact a second tooth, and a thickness between the first contact surface and the second contact surface, a structural frame integrated into the composite body, and a handle extending outwardly from the composite body.

According to another embodiment of the present disclosure, a kit is provided including a first spacer having a first thickness and a second spacer having a second thickness that differs from the first thickness.

According to yet another embodiment of the present disclosure, a method of using an orthodontic spacer is provided, the method including the steps of: selecting a spacer from a plurality of spacers, the selected spacer having a composite body with a first contact surface, a second contact surface, and a desired thickness between the first contact surface and the second contact surface, applying the second contact surface of the selected spacer to a patient's tooth while retaining the desired thickness, and curing the composite body of the spacer upon the patient's tooth.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
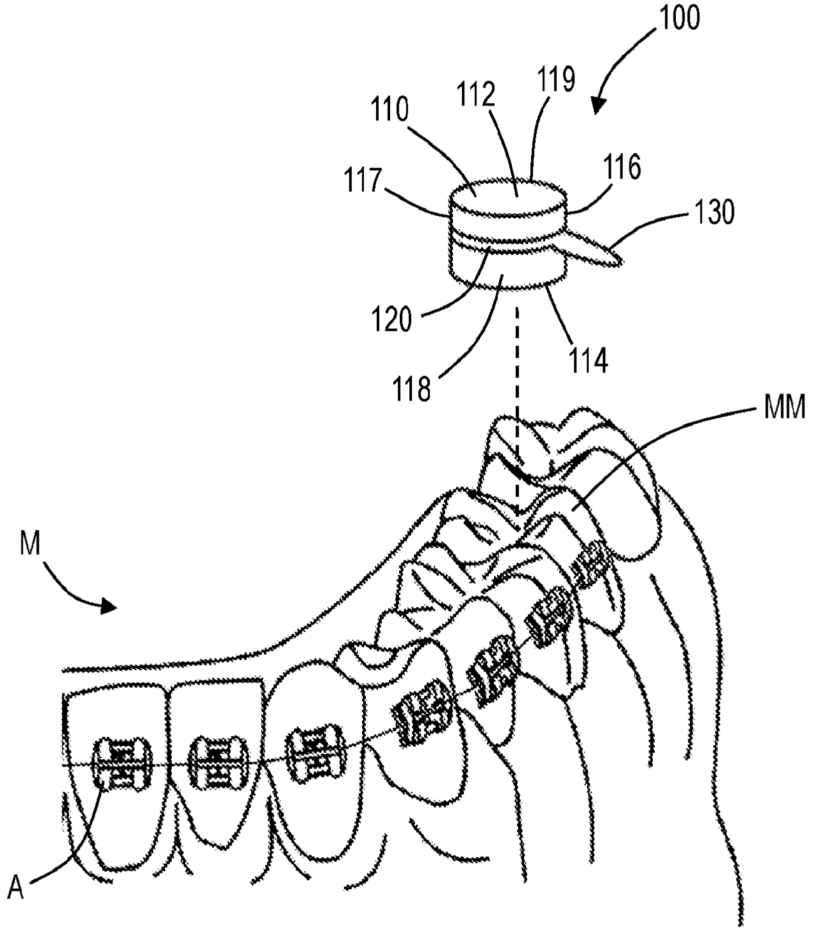
FIG. 1 is a perspective view of an exemplary orthodontic spacer of the present disclosure shown in a patient's mouth, the orthodontic spacer including a composite body, a structural frame, and a handle.
Figure 2:
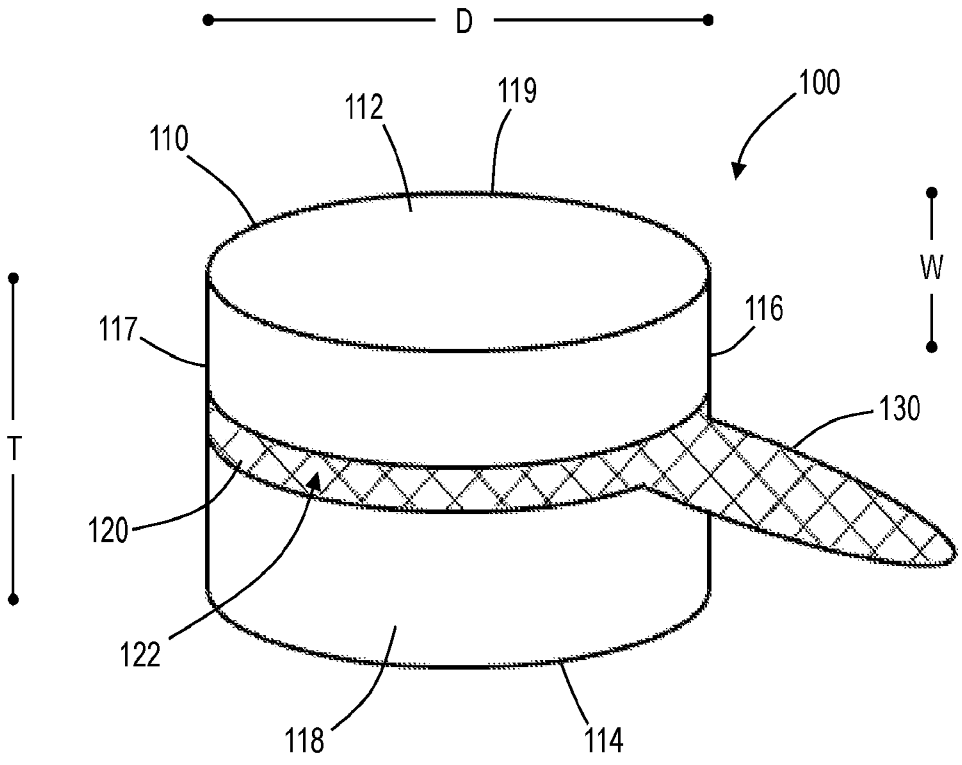
FIG. 2 is a perspective view of the orthodontic spacer of FIG. 1.

Referring initially to FIGS. 1 and 2, an exemplary orthodontic spacer 100 (i.e., a build-up, a bite block) is provided for use in a patient's mouth M having an orthodontic appliance A (illustratively, braces). The spacer 100 includes a composite body 110, a structural support or frame 120, and a handle 130, each of which is described further below.

The composite body 110 of the spacer 100 includes a first contact surface 112 (illustratively, an upper or maxillary surface) and a second contact surface 114 (illustratively, a lower or mandibular surface). The second contact surface 114 is configured to be fixedly coupled to one of the patient's mandibular teeth (illustratively, the patient's second mandibular molar MM), and the opposing first contact surface 112 is configured to selectively contact the patient's opposing maxillary tooth (not shown) when the patient bites down on the spacer 100. In this way, the spacer 100 limits movement of the patient's mouth M and restricts the patient's full bite closure, thereby inhibiting the patient's teeth from contacting the orthodontic appliance A. The first contact surface 112 and/or the second contact surface 114 may be planar, as shown in FIG. 1, or contoured to match the corresponding tooth.

The composite body 110 also includes a facial side 116, an opposing lingual side 117, a mesial side 118, and an opposing distal side 119. The illustrative composite body 110 of FIG. 1 is generally cylindrical in shape, such that the first contact surface 112 and the second contact surface 114 have generally circular profiles, although these shapes may vary. For example, the first contact surface 112 and/or the second contact surface 114 may have generally rectangular profiles.

As shown in FIG. 2, the composite body 110 has a predetermined thickness T between the first contact surface 112 and the second contact surface 114. In certain embodiments, the predetermined thickness T is about 1 mm to about 8 mm, such as 1 mm, 2 mm, 3 mm, 4 mm, 5 mm, 6 mm, 7 mm, or 8 mm.

The composite body 110 also has a predetermined depth D between the facial side 116 and the lingual side 117. In certain embodiments, the predetermined depth D is about 6 mm to about 11 mm, such as 6 mm, 7 mm, 8 mm, 9 mm, 10 mm, or 11 mm. It is also within the scope of the present disclosure for the depth D to vary across the thickness T of the composite body 110 between the first contact surface 112 and the second contact surface 114. For example, the depth D at the first contact surface 112 may exceed the depth D at the second contact surface 114.

The composite body 110 also has a predetermined width W between the mesial side 118 and the distal side 119. In certain embodiments, the predetermined width W is about 6 mm to about 11 mm, such as 6 mm, 7 mm, 8 mm, 9 mm, 10 mm, or 11 mm. It is also within the scope of the present disclosure for the width W to vary across the thickness T of the composite body 110 between the first contact surface 112 and the second contact surface 114. For example, the width W at the second contact surface 114 may exceed the width W at the first contact surface 112.

The structural frame 120 of the spacer 100 may be integrated into the composite body 110 and may be sufficiently rigid to support and stabilize the composite body 110. In certain embodiments, the frame 120 may be embedded within the composite body 110 between the first contact surface 112 and the second contact surface 114. The frame 120 may include pores or openings 122 configured to receive the surrounding composite body 110. The illustrative frame 120 is a stiff fabric or wire mesh defining pores 122, although this material may vary.

The handle 130 of the spacer 100 extends outwardly from the composite body 110 and allows the orthodontic professional to grip and manipulate the composite body 110. In the illustrated embodiment of FIG. 1, the handle 130 extends outwardly from the composite body 110 at a location between the facial side 116 and the mesial side 118 to facilitate access by the orthodontic professional, although this position may vary. Also, in the illustrated embodiment of FIG. 1, the handle 130 is an extension of the structural frame 120, but it is also within the scope of the present disclosure for the handle 130 to be a distinct component that is coupled to the composite body 110 and/or the structural frame 120. The handle 130 is configured to be separated from (e.g., drilled apart from, cut from, pulled from) the composite body 110.

Figure 3:
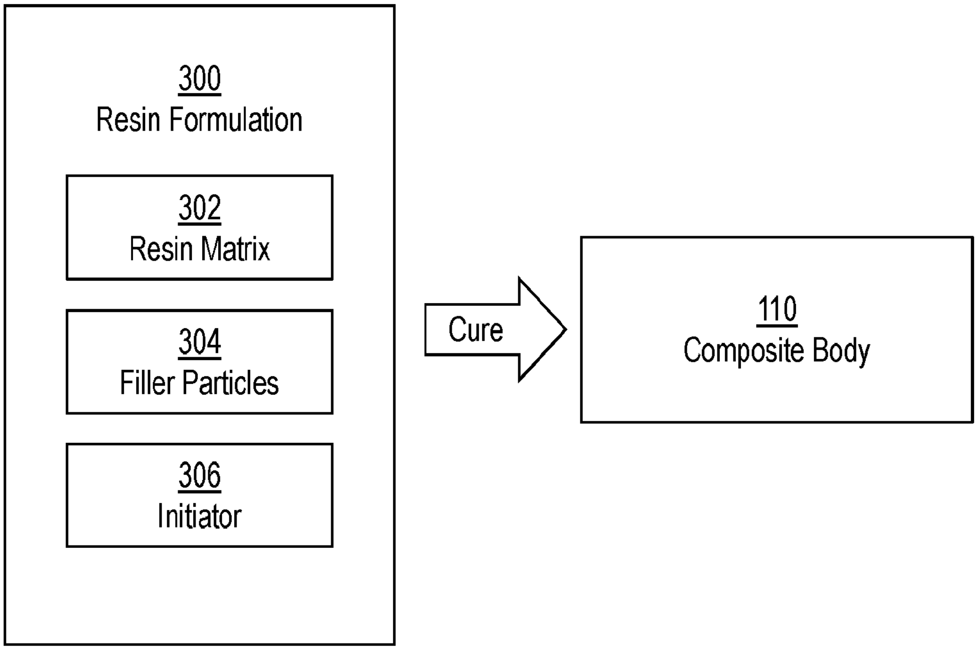
FIG. 3 is a schematic view of a resin formulation used to form the composite body of FIG. 1.

Referring next to FIG. 3, the composite body 110 is formed from a curable, viscous, thick, dense, non-flowable, dimensionally stable resin formulation 300. An exemplary resin formulation 300 is sufficiently malleable to be deformed under pressure from the orthodontic professional, yet sufficiently dimensionally stable to maintain its shape over time prior to curing absent such pressure. In certain embodiments, the resin formulation 300 may retain about 70%, about 80%, about 90%, about 95%, or about 100% of its thickness under a load and about 90%, about 95%, about 99%, or about 100% of its thickness over time absent such load.

The resin formulation 300 includes a resin matrix 302, inorganic filler particles 304, and a polymerization initiator 306. In dentistry applications, the resin formulation 300 may be comparable to heavily filled posterior composite resins used in direct dental restorations (e.g., fillings), such as a 3M™ Filtek™ Supreme Ultra Universal Restorative resins.

The resin matrix 302 of the resin formulation 300 includes one or more reactive monomers. In certain embodiments, the resin matrix 302 may be methacrylate-based and may include one or more methacrylate and/or dimethacrylate monomers. Suitable monomers include, for example, bisphenol A glycidyl methacrylate (bis-GMA), bisphenol A polyethylene glycol diether dimethacrylate (bis-EMA), hydroxyethyl methacrylate (HEMA), triethylene glycol methacrylate (TEGMA), triethylene glycol dimethacrylate (TEGDMA), urethane dimethacrylate (UDMA), polyethylene glycol methacrylate (PEGMA), polyethylene glycol dimethacrylate (PEGDMA), and combinations thereof. The resin matrix 302 may contain a high-viscosity monomer such as bis-GMA as the primary ingredient and other mid-viscosity monomers such as UDMA and/or low-viscosity monomers such as TEGDMA as minor ingredients (i.e., diluents) to control viscosity. In other embodiments, the resin matrix 302 may be oligomeric-based, silorane-based, or thiolene-based, for example.

The filler particles 304 of the resin formulation 300 may control the viscosity, color, toughness, and other properties of the resin formulation 300. Suitable filler particles 304 include ceramics and glasses, such as silica, zirconia, strontium glass, barium glass, quartz, borosilicate glass, and combinations thereof. Depending on the viscosity of the resin matrix 302 alone, the resin formulation 300 may contain about 70 wt. % or more of the filler particles 304 to achieve dimensional stability (unlike flowable resin formulations which typically contain less than 70 wt. % of filler particles). The filler particles 304 may vary in average size, from nanoparticles of about 1 nm to about 100 nm (e.g., about 10 nm to about 40 nm) in average size, to sub-micron particles of about 0.1 μm to about 1 μm in average size, to microparticles of about 1 μm to about 10 μm or more in average size. The filler particles 304 may also vary in shape, from spheres to fibers, Neighboring filler particles 304 may be discrete, loosely agglomerated, and/or densely compacted, for example.

The polymerization initiator 306 of the resin formulation 300 may be a photoinitiator configured to initiate polymerization of the resin matrix 302 when exposed to light, typically ultraviolet (UV) light at 400-500 nm. Suitable polymerization initiators 306 include, for example, amphorquinone (CQ), 1-phenyl-1,2-propanedione (PPD), and phenylbis(2,4,6-trimethylbenzoyl)phosphine oxide (TPO). The resin formulation 300 may contain about 2 wt. % or less of the polymerization initiator 306.

The resin formulation 300 may be configured to match the patient's tooth MM. For example, the opacity of the resin formulation 300 (e.g., transparent, opaque) may be selected to match the patient's tooth MM. In another example, the shade of the resin formulation may be selected to match the patient's tooth MM, which may be determined using the VITA Classical A1-D4® Shade System.

The resin formulation 300 may lack any flowing agents or other ingredients intended to further decrease the viscosity of the resin formulation 300. Such flowing agents include, for example, dimethylglyoxime.

Figure 4:
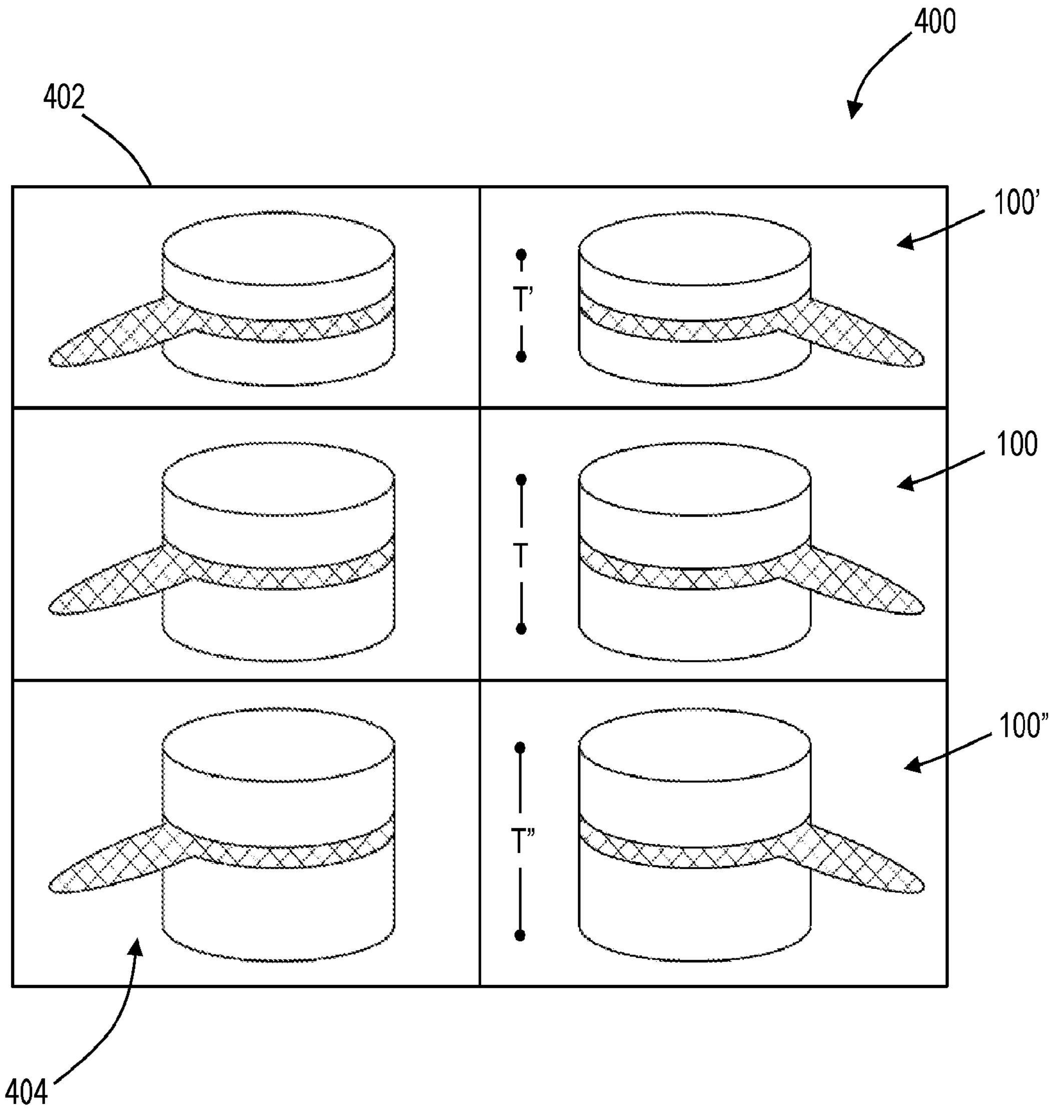
FIG. 4 is a perspective view of a kit including the orthodontic spacer of FIG. 1.

Referring next to FIG. 4, a kit 400 is provided including the spacer 100, as well as various other spacers 100', 100". Each spacer 100, 100', 100" in the kit 400 may have a different thickness T, T', T". Mirror-image versions of each spacer 100, 100', 100" may also be provided for use on opposing sides of the patient's mouth M (FIG. 1). Kit 400 may also include one or more packages 402 configured to contain and protect spacers 100, 100', 100" in a sterile manner. In the illustrated embodiment of FIG. 4, the package 402 is a box having separate compartments 404 for each spacer 100, 100', 100".

Figure 5:
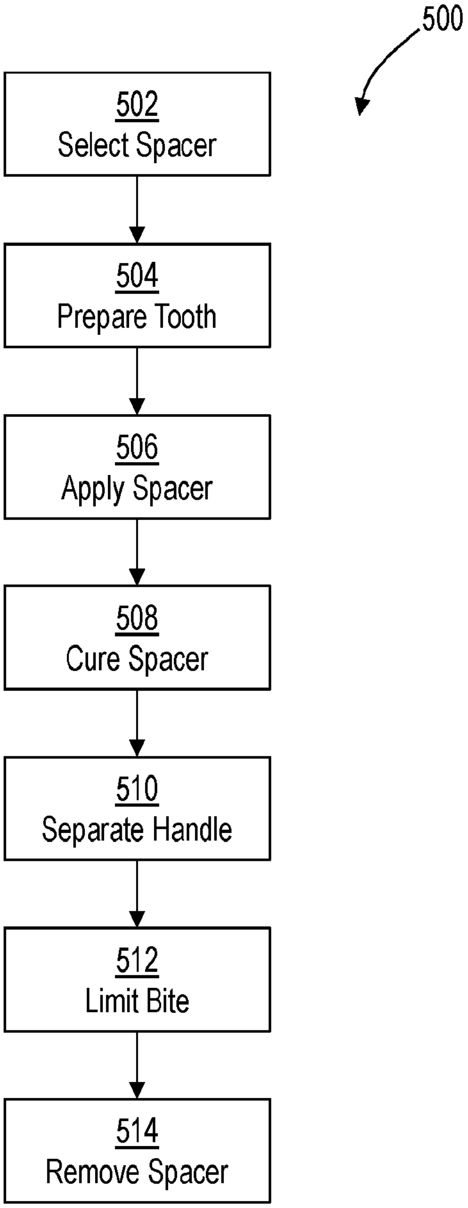
FIG. 5 is a flow chart showing an exemplary method for using the orthodontic spacer of FIG. 1.

Referring next to FIG. 5, an exemplary method 500 is provided for using the spacer 100.

In step 502 of method 500, the desired spacer 100 is selected from the kit 400 (FIG. 4). This selecting step 502 may involve measuring a desired spacing between the patient's teeth and choosing the spacer 100 having the corresponding thickness T.

In step 504 of method 500, the patient's tooth MM (FIG. 1) is prepared to receive the spacer 100. This preparing step 504 may involve cleaning, drying, and applying a dental adhesive such as a 3M™ Transbond™ primer.

In step 506 of method 500, the spacer 100 is applied to the patient's tooth MM (FIG. 1). This applying step 506 may involve gripping the handle 130 of the spacer 100 and placing the composite body 110 of the spacer 100 upon the patient's tooth MM (FIG. 1). Because the composite body 110 is malleable, the orthodontic professional may apply slight pressure to the spacer 100 to conform the second contact surface 114 of the spacer 100 to the patient's tooth MM. However, because the composite body 110 is also dimensionally stable and supported by the structural frame 120, the spacer 100 may substantially retain its desired thickness T between the first contact surface 112 and the second contact surface 114 during and after this applying step 506.

In step 508 of method 500, the spacer 100 is cured in situ upon the patient's tooth MM (FIG. 1). This curing step 508 may involve exposing the spacer 100 to light, typically UV light at 400-500 nm, for a suitable time, such as about 10 seconds to about 120 seconds. This curing step 508 causes the spacer 100 to polymerize and solidify, while also causing the second contact surface 114 of the spacer 100 to fixedly couple to the patient's tooth MM.

In step 510 of method 500, the handle 130 (FIG. 1) is separated from the spacer 100. This separating step 510 may involve drilling, cutting, pulling, or otherwise removing the handle 130 from the spacer 100. In certain embodiments, the handle 130 may be perforated to facilitate such separation.

In step 512 of method 500, the patient is free to bite down upon the first contact surface 112 of the cured spacer 100 (FIG. 1). In this way, the spacer 100 limits movement of the patient's mouth M and inhibits the patient's teeth from biting or otherwise contacting the orthodontic appliance A.

Finally, in step 514 of method 500, the spacer 100 is drilled or otherwise removed from the patient's mouth M (FIG. 1). This removing step 514 may be performed at the same time the orthodontic appliance A is removed from the patient's mouth M.

The method 500 may be repeated for multiple teeth. Advantageously, the predetermined and stable thickness T of each spacer 100 allows the orthodontic professional to achieve a desired spacing at each individual location.

EXAMPLES

Example 1: Dimensional Stability Under Load

A 3M™ Filtek™ Supreme Ultra Universal Restorative resin (Product Ref. 6028A2B) was ejected from its dispenser and rolled into a ball having a diameter of about 1 cm. Round discs each weighing 2.5 grams were applied onto the ball and allowed to rest for 10 seconds. The diameter of the ball was measured after each added disc. The results are presented in Table 1 below.

TABLE 1

| Load (g) | Diameter (cm) | Dimensional Stability (%) |
|---|---|---|
| 0.0 | 1.0 | — |
| 2.5 | 1.0 | 100% |
| 5.0 | 1.0 | 100% |
| 7.5 | 0.9 | 90% |
| 10.0 | 0.9 | 90% |
| 12.5 | 0.8 | 80% |
| 15.0 | 0.8 | 80% |
| 17.5 | 0.75 | 75% |
| 20.0 | 0.7 | 70% |
| 22.5 | 0.7 | 70% |

Example #2: Dimensional Stability Over Time

A 3M™ Filtek™ Supreme Ultra Universal Restorative resin (Product Ref. 6028A2B) was ejected from its dispenser and rolled into a ball having a diameter of about 1 cm. The diameter of the ball was measured over time. The results are presented in Table 2 below.

TABLE 2

| Time | Diameter (cm) | Dimensional Stability (%) |
|---|---|---|
| 0 seconds | 1.0 | — |
| 15 seconds | 1.0 | 100% |
| 30 minutes | 1.0 | 100% |
| 1 hour | 1.0 | 100% |
| 6 hours | 1.0 | 100% |

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composite orthodontic spacer comprising:

a sterile package;

a composite body formed from a curable resin formulation, wherein the composite body has a first contact surface configured to contact a first tooth, a second contact surface configured to contact a second tooth, and a thickness between the first contact surface and the second contact surface, wherein the resin formulation is dimensionally stable to maintain its thickness while contained in the package and malleable such that the first and second contact surfaces of the composite body are conformable to the first and second teeth, respectively, when removed from the package;

a structural frame integrated into the resin formulation of the composite body between the malleable first and second contact surfaces while contained in the package; and a handle extending outwardly from the composite body.

2. The spacer of claim 1, wherein the curable resin formulation includes one or more methacrylate or dimethacrylate monomers.

3. The spacer of claim 1, wherein the curable resin formulation includes inorganic filler particles.

4. The spacer of claim 1, wherein the curable resin formulation includes a photoinitiator.

5. The spacer of claim 1, wherein the structural frame is a wire mesh with pores that receive the composite body.

6. The spacer of claim 1, wherein the handle is an extension of the structural frame.

7. The spacer of claim 1, wherein the curable resin formulation retains at least about 70% of its thickness under a load.

8. The spacer of claim 1, wherein the curable resin formulation retains at least about 90% of its thickness over time absent a load.

9. A kit comprising:
 the spacer of claim 1;
 a second spacer having a second thickness that differs from the thickness of claim 1;
 wherein the package has a first compartment containing the spacer of claim 1 and a second compartment containing the second spacer.

10. The kit of claim 9, further comprising a third spacer having a third thickness that differs from the thickness and the second thickness, wherein the package has a third compartment containing the third spacer.

11. The spacer of claim 1,
 wherein the first contact surface and the second contact surface are each planar such that the thickness between the first contact surface and the second contact surface is substantially uniform.

12. The spacer of claim 11, wherein the thickness is about 1 mm to about 8 mm.

13. The spacer of claim 11, wherein the resin formulation is a heavily filled posterior composite resin.

14. The spacer of claim 1, wherein the handle is removably coupled to the structural frame.

15. A method of using an orthodontic spacer, the method comprising the steps of:
 selecting a spacer from a plurality of spacers, the selected spacer having a composite body and a handle that extends outwardly from the composite body, the composite body having a first contact surface, a second contact surface, and a desired thickness between the first contact surface and the second contact surface;
 applying the second contact surface of the selected spacer to a patient's tooth while retaining the desired thickness;
 curing the composite body of the spacer upon the patient's tooth; and
 separating the handle from the composite body after the curing step.

16. The method of claim 15, wherein the applying step comprises gripping the handle.

17. The method of claim 15, wherein the curing step comprises exposing the spacer to ultraviolet light.

18. The method of claim 15, further comprising limiting the patient's bite to the first contact surface of the spacer.

19. The method of claim 18, further comprising removing the spacer from the patient's tooth after the limiting step.

20. The spacer of claim 15, wherein the curable resin formulation retains at least about 70% of the desired thickness during the applying step.

21. The spacer of claim 15, wherein the curable resin formulation retains at least about 90% of the desired thickness before and after the applying step.

* * * * *